(12) United States Patent
Yamashita et al.

(10) Patent No.: US 7,035,496 B2
(45) Date of Patent: Apr. 25, 2006

(54) DRIVE UNIT FOR OPTICAL SWITCH

(75) Inventors: Shinji Yamashita, Kawasaki (JP); Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 394 days.

(21) Appl. No.: 10/097,931

(22) Filed: Mar. 15, 2002

(65) Prior Publication Data

US 2003/0081882 A1    May 1, 2003

(30) Foreign Application Priority Data

Oct. 30, 2001    (JP) ............................ 2001-333567

(51) Int. Cl.
G02B 6/35 (2006.01)
(52) U.S. Cl. .............. 385/16; 385/18; 216/2
(58) Field of Classification Search ............ 385/16–23, 385/33; 257/415; 216/2
See application file for complete search history.

(56) References Cited

U.S. PATENT DOCUMENTS

| | | | |
|---|---|---|---|
| 5,970,186 A * | 10/1999 | Kenney et al. ............... 385/16 |
| 6,533,947 B1 * | 3/2003 | Nasiri et al. .................... 216/2 |
| 2002/0085789 A1 * | 7/2002 | Chung ........................... 385/16 |
| 2003/0103717 A1 * | 6/2003 | Aksyuk et al. ................. 385/18 |
| 2003/0122206 A1 * | 7/2003 | Bhattarai et al. ............ 257/415 |
| 2003/0138191 A1 * | 7/2003 | Pouteau et al. ................ 385/16 |
| 2004/0149679 A1 * | 8/2004 | Song et al. .................... 216/13 |

* cited by examiner

*Primary Examiner*—Frank G. Font
*Assistant Examiner*—Eric Wong
(74) *Attorney, Agent, or Firm*—Staas & Halsey LLP

(57) ABSTRACT

A drive unit for controlling optical paths of an optical switch having at least one optical switch element and at least one pair of electrodes arranged near the optical switch element, each pair including a first electrode and a second electrode provided at a position opposite to the first electrode. The drive unit includes at least one drive circuit for the at least one optical switch element, respectively. The drive circuit has an output for supplying voltages to the electrodes to generate electrostatic forces between the electrodes and the optical switch element and the voltages are separated into positive voltages supplied to the first electrode and negative voltages supplied to the second electrode.

12 Claims, 20 Drawing Sheets

(INPUT)   (OUTPUT)

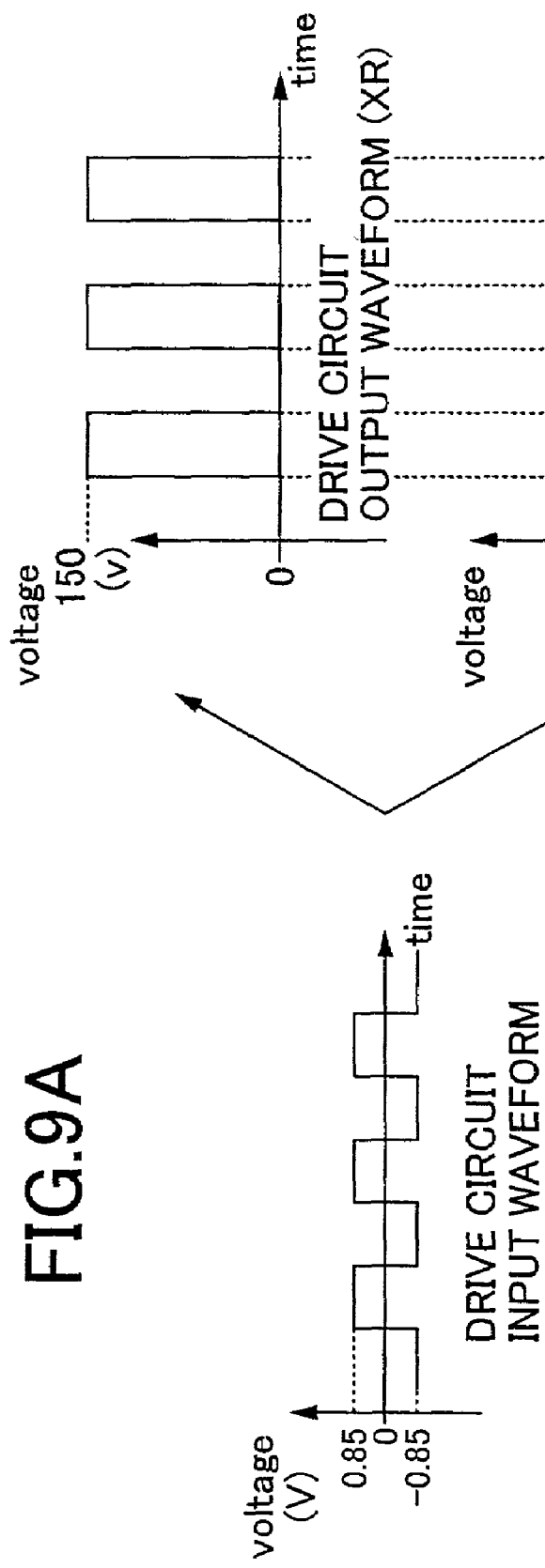
FIG.9A DRIVE CIRCUIT INPUT WAVEFORM
FIG.9B DRIVE CIRCUIT OUTPUT WAVEFORM (XR)
FIG.9C DRIVE CIRCUIT OUTPUT WAVEFORM (XL)

DRIVE UNIT FOR OPTICAL SWITCH

BACKGROUND OF THE INVENTION

1. Field of the Invention

The present invention relates to a drive unit for an optical switch and particularly relates to a drive unit for an optical switch that can be applied in an optical network.

Recently, amount of data traffics transmitted on networks is sharply increasing due to rapid growth of the Internet. Therefore, a network configuration needs to be changed from a ring-type configuration to a mesh-type configuration to establish and release communication paths in a more dynamic manner. To this end, a large-scale cross-connect (XC) apparatus is required. However, currently available XC apparatuses do not have sufficient capacity (data capacity) and have limitations on electric signal processing for increased signal bit-rate. Therefore, it is difficult to build a large-scale optical switch system with currently available XC apparatuses.

MEMS (Micro-Electro Mechanical System) is one of the technologies that may be applied to such a large-scale optical switch system. FIG. 2A shows a MEMS optical switch having a two-dimensional configuration and FIGS. 1A, 1B and 2B show a MEMS optical switch of a three-dimensional configuration. In general, the MEMS optical switch of a three-dimensional configuration shown in FIG. 2B has a reduced spatial propagation distance as compared to the MEMS optical switch of a two-dimensional configuration. Accordingly, as shown in FIG. 2C, the MEMS optical switch of a three-dimensional configuration has reduced coupling loss as compared to the MEMS optical switch of the two-dimensional configuration. Therefore, the MEMS optical switch of a three-dimensional configuration is becoming of interest as a structure enabling a network of a larger scale.

FIG. 1A is a diagram showing an example of a configuration of the above-mentioned MEMS optical switch of a three-dimensional configuration. The MEMS optical switch of a three-dimensional configuration includes two optical switches 10 and 20, each including N two-axis micro-mirrors (tilt mirrors). As shown in FIG. 1B, each micro-mirror is rotatable about two axis that are mutually perpendicular. The micro-mirrors of the optical switch 10 are controlled such that light beams from optical fibers of an input optical fiber array 30 are reflected in desired directions and incident on desired micro-mirrors of the optical switch 20. The micro-mirrors of the optical switch 20 is controlled in a similar manner such that the incident light beams are reflected in desired directions and incident on desired optical fibers of the output optical fiber array 40.

Thus by controlling tilt angles of the micro-mirrors of the optical switches 10 and 20 in a three-dimensional manner, the light beams from the optical fibers of the input optical fiber array 30 are reflected on predetermined micro-mirrors of the optical switches 10 and 20 and are incident on intended optical fibers of the output optical fiber array 40. As a result, the optical fiber arrays 30 and 40 are optically connected or coupled such that optical signals can be passed from any one of the optical fiber of the input optical fiber array 30 to any optical fiber of the output optical fiber array 40.

FIG. 2A is a diagram showing an optical switch of a two-dimensional configuration. The optical switch of a two-dimensional configuration includes $N^2$ micro-mirrors arranged in an N×N matrix. The micro-mirrors are controlled to tilt about a single axis to connect or couple optical paths between any of the N input fibers and any of the N output fibers. With such an optical switch of a two-dimensional configuration, a spatial propagation distance of a light beam taking the outermost path becomes greater than a spatial propagation distance of a light beam taking the innermost path. As can be seen in FIG. 2C, for the two-dimensional MEMS optical switch, the spatial propagation distance increases directly proportional to the number of fibers N.

FIG. 2C also shows a relationship between the spatial propagation distance and the number of fibers (N) for the optical switch of a three-dimensional configuration shown in FIG. 2B. As can be seen in FIG. 2C, the optical switch of a three-dimensional configuration of FIG. 2B is particularly advantageous when the number of fibers N exceeds fifty. It is to be noted that a signal loss is proportional to an increase of the spatial propagation distance, and therefore, an increase in the spatial propagation distance results in a reduction of transmission efficiency.

The present invention relates to a drive unit for an optical switch of a three-dimensional configuration based on a technique such as the above-mentioned MEMS technique suitable for a large-scale optical switch system.

2. Description of the Related Art

It is known to drive the MEMS optical switch of a three-dimensional configuration by means of electrostatic attractive forces produced between micro-mirrors (tilt mirrors) and predetermined electrodes. Two pairs of electrodes are provided for each micro-mirror for tilting the micro-mirror about the x-axis and y-axis. In order to control tilt angles of the micro-mirrors, voltages applied to the electrodes are varied for adjusting electrostatic forces applied to the micro-mirror. As shown in FIGS. 1A and 1B, tilt angles of micro-mirrors of an input-side optical switch and micro-mirrors of an output-side optical switch are controlled to redirect light beams from any one of the input ports towards any one of the output ports.

The optical switch of such a configuration is known from reports made by χ ros (now a part of Nortel) or Lucent Technologies Inc. at various conferences and in press-releases. However, no suggestions have been made about a configuration of a drive circuit part for applying voltages to electrodes. It can be simply assumed that a single drive circuit should be provided for each of the electrodes. Therefore, such a configuration of a driving circuit part is to be understood as a related art.

FIG. 3 is a schematic diagram showing an example of a drive unit of an optical switch of the related art. In this example, a control circuit 100 selects a mirror MM to be controlled. Then the control circuit 100 looks up a memory table to read out digital signals (voltage information for achieving a desired angle) that are associated with tilt angles of the mirror MM in a one-to-one relationship. Then, the control circuit 100 outputs the obtained digital signals. The digital signals are converted into analog signals in D/A converters 121, 122, 123 and 124. Drive circuits (DRV) 131, 132, 133 and 134 amplify the analog signals and supply corresponding voltages to each electrode (XR#1, XL#1, YU#1, YD#1). The tilt angles of the micro-mirror MM are adjusted in accordance with the supplied voltages. Accordingly, optical paths of the light beams can be redirected.

FIG. 4 is a diagram showing an example of a drive unit of an optical switch of the related art for an optical switch of an N-channel configuration. The optical switch has N micro-mirrors and thus N sets of D/A converters and drive circuits DRV are required. In the figure, the configuration of an input side system 10 is shown, but it is to be understood that the configuration of an output side system 20 is similar to the input side system 10.

In general, the MEMS optical switch of the above-described type using electrostatic attractive forces requires a voltage in a range of several tens to several hundreds of volts to achieve a maximum tilt angle. A supply voltage of the drive circuit should be of the same range. Moreover, with the drive unit of the related art shown in FIG. 4, 4×N drive circuits are required for each of the N mirrors. Therefore, an overall size and consumption power of the entire optical switch including the drive circuit becomes unacceptably large.

SUMMARY OF THE INVENTION

Accordingly, it is a general object of the present invention to provide a drive unit for an optical switch that can obviate the problems described above.

It is another and more specific object of the present invention to provide a drive unit for an optical switch having a hardware configuration with efficiently reduced the size that facilitates constructing a large-scale optical network.

In order to achieve the above objects, a drive unit is provided which controls optical paths of an optical switch having at least one optical switch element and at least one pair of electrodes arranged near the optical switch element, each pair including a first electrode and a second electrode provided at a position opposite to the first electrode. The drive unit includes at least one drive circuit for the at least one optical switch element, respectively, the drive circuit having an output for supplying voltages to the electrodes to generate electrostatic forces between the electrodes and the optical switch element, the voltages being separated into positive voltages supplied to the first electrode and negative voltages supplied to the second electrode.

With the drive unit described above, movements of the optical switch element in mutually opposite directions can be controlled by a single drive circuit. Thus, the number of drive circuits required for the drive unit of the optical switch can be halved as compared to the related art. Such a configuration is particularly advantageous for reducing the size of a hardware configuration of a optical switch of a three-dimensional configuration having a plurality of two-axis micro-mirrors in which operations in mutually opposite directions are implemented for each of the axis perpendicular to each other.

The drive unit of the present invention may include two drive circuits and further provided with at least one output-holding circuit for holding the positive voltages and negative voltages from the drive circuits and supplying the voltages to the electrodes of the at least one optical switch element.

With the drive unit described above, a plurality of micro-mirrors can be simultaneously controlled by a single drive circuit. Therefore, the scale of a hardware configuration can be greatly reduced and consumption power can be effectively reduced.

BRIEF DESCRIPTION OF THE DRAWINGS

FIG. 9A is a diagram showing an input waveform and FIGS. 9B and 9C are diagrams showing output waveforms of the drive units shown in FIG. 7.

DETAILED DESCRIPTION OF THE PREFERRED EMBODIMENTS

In the following, principles and embodiments of the present invention will be described with reference to the accompanying drawings.

The principle of the present invention will be described with reference to FIGS. 5 and 6.

Figure 5:
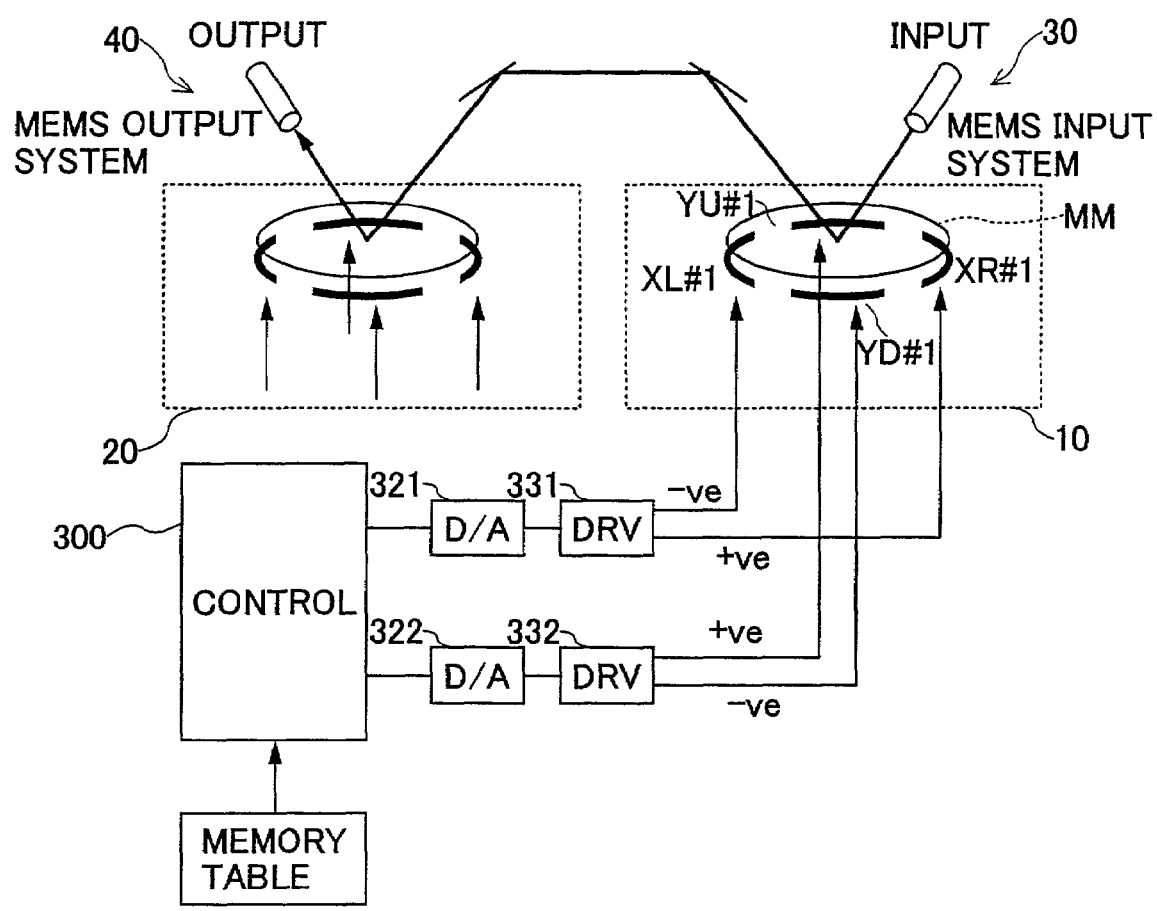
FIG. 5 is a schematic diagram showing an example of a drive unit of an optical switch of a first embodiment of the present invention.

In an example shown in FIG. 5, a control circuit 300 selects a micro-mirror MM to be controlled. Then the control circuit 300 looks up a predetermined memory table to read out digital signals (voltage information for achieving a desired angle) that are associated with tilt angles of the micro-mirror MM in a one-to-one relationship. Then, the control circuit 300 outputs the obtained digital signals. In the example shown in FIG. 5, two sets of digital converter D/A 321 and 322 and drive circuits 331 and 332, respectively, are provided. The digital signals are converted into analog signals in the D/A converters 321 and 322. The drive circuits (DRV) 331 and 332 amplify the analog signals. The drive circuits (DRV) 331 and 332 separate positive voltage portion and negative voltage portions of the output voltage. Then, the positive voltage portions and the negative voltage portions are applied to electrodes XR#1 and XL#1, respectively, or to electrodes YU#1 and YD#1, respectively.

It is to be noted that electrostatic force does not have polarities (i.e., only serves as an attractive force). If absolute values for the positive voltage portion and the negative voltage portion are equal, tilt angles of the micro-mirror MM caused by the positive and negative voltage will be equal. Therefore, a single drive circuit shown in FIG. 5 is equivalent to two drive circuits shown in FIG. 3. In other words, the drive circuit 331 of FIG. 5 corresponds to the drive circuits 131 and 132 of FIG. 3 and the drive circuit 332 of FIG. 5 corresponds to the drive circuits 133 and 134 of FIG. 3.

Figure 6:
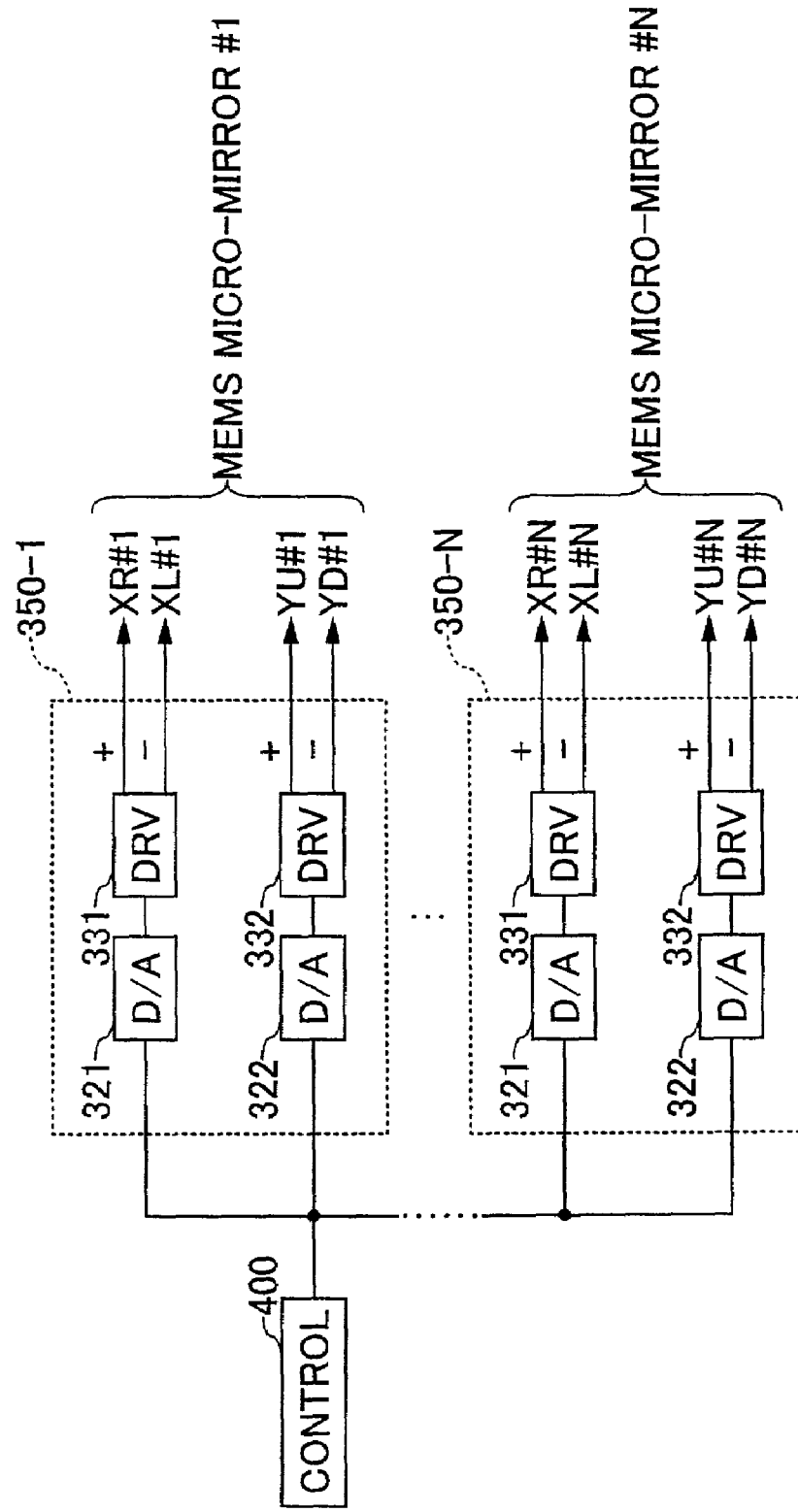
FIG. 6 is a diagram showing an example of a drive unit of an optical switch of a first embodiment of the present invention.

FIG. 6 is a diagram showing an example of a drive unit of an optical switch of a first embodiment of the present invention. As shown in FIG. 6, according to the present invention, 2×N drive circuits DRV are sufficient for achieving a function equivalent to the optical switch of the related art for N micro-mirrors MM. Accordingly, since the number of drive circuits of the first embodiment of the present invention is a half of the number of drive circuits of the optical switch of the related art, the size of the optical switch as a whole is reduced and the optical switch can be operated with a reduced consumption power.

Figure 7:
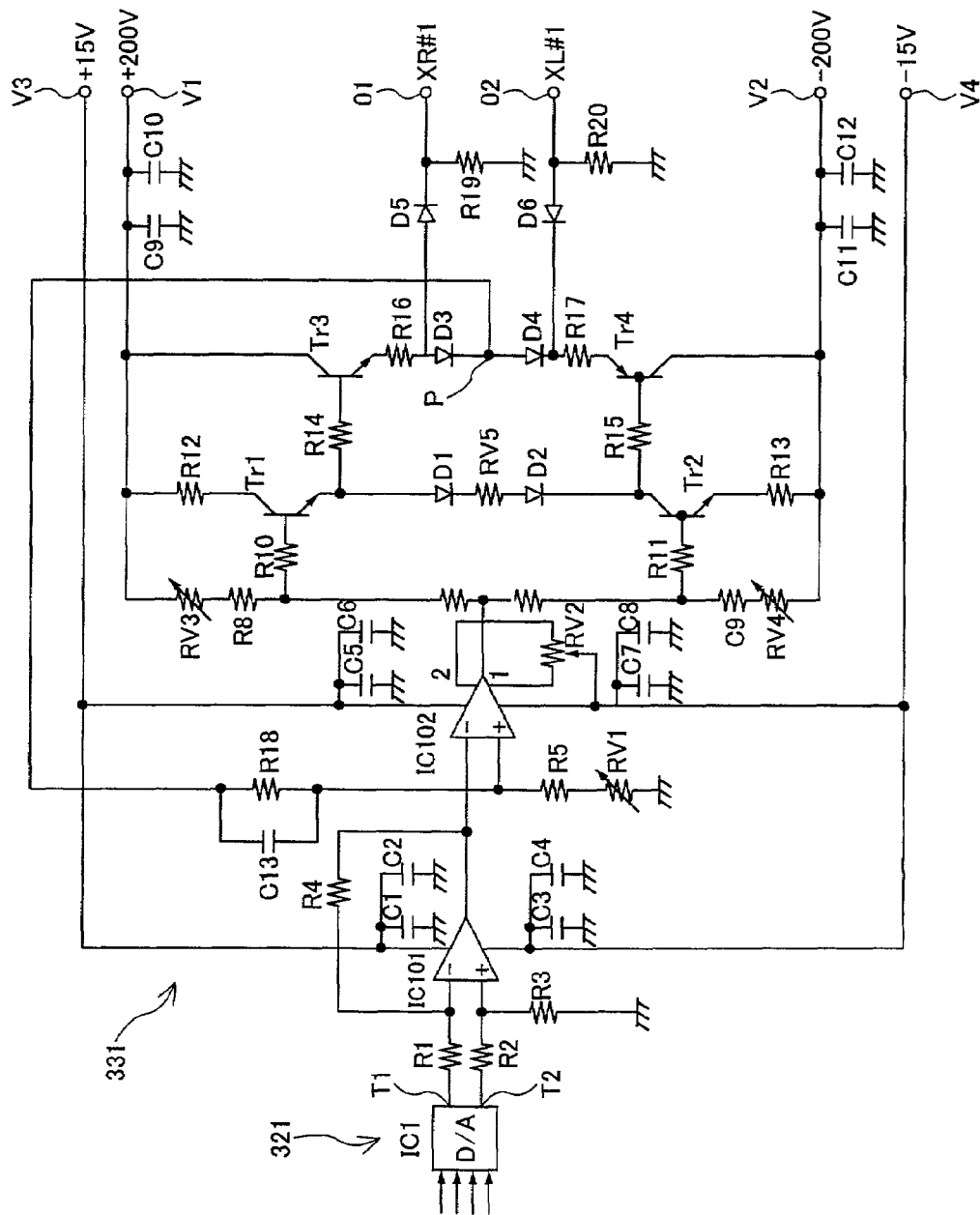
FIG. 7 is an exemplary circuit diagram of a drive circuit provided in drive units of optical switches of first through sixth embodiments of the present invention.

FIG. 7 is an exemplary circuit diagram of a drive circuit provided in drive units of optical switches of first through sixth embodiments of the present invention. Referring to FIG. 7, a detailed circuit structure of the above-mentioned drive circuit 331 will be described. It is to be noted that the drive circuit 332 has a similar structure.

In FIG. 7, an IC 1 is a D/A converter 321 that converts digital outputs of the control circuit into analog values (e.g., centered on +1.25V with a width of 0.85 V). The IC1 has two outputs T1 and T2. The output T1 outputs a reference value having a constant value (e.g., +1.25V). The output T2 outputs the above-mentioned analog value. Therefore, an input to the drive circuit 331 is in the range of about −0.85V to 0.85 V (about 1.7V). This is shown in FIG. 9A which shows an input waveform of the drive circuit. In FIG. 9A, the input waveform is shown as a rectangular wave with two values 0.85 and −0.85V. However, the input waveform may vary continuously between the two values in a linear manner (in an analog manner) such that the tilt angle of the micro-mirror MM can be controlled in a continuous manner (in an analog manner).

Referring again to FIG. 7, a differential amplifier IC 101 and resistors R1, R2, R3 and R4 form a subtraction circuit that cancels the above-described DC value of +1.25V and outputs an analog value of +/−0.85V centered on 0V. A differential amplifier IC 102 and transistors Tr1 through Tr4 form an amplifying part of a so-called emitter-follower type with a negative feedback via a resistor R18 and a capacitor C13. With such a configuration, a gain of the emitter-follower amplifying part can be expressed as:

$$\text{Gain} = 1 + R18/(R5 + RV1).$$

Therefore, the gain can be adjusted by adjusting a resistance value of the variable resistor RV1.

The differential amplifier 102 has offset adjustment terminals (1,2) that are connected with each other via a variable resistor RV2. An output offset can be adjusted by adjusting a resistance value of the variable resistor RV2. When there is no offset adjusting terminals or when the offset adjusting terminals are not used, an adder circuit may be provided to perform offset adjustment by adding a predetermined DC value to the output.

A variable resistor RV3 and a resistor R8 are provided for determining a bias voltage of the transistor Tr1. Similarly, a variable resistor RV4 and a resistor R9 are provided for determining a bias voltage of the transistor Tr2.

Further, diodes D1 and D2 determines bias voltages of transistors Tr3 and Tr4. Without the diodes D1 and D2, a so-called switching distortion is produced near a zero-output level. In such a case, a linear response cannot be obtained. A variable resistor RV5 is inserted between the diodes D1 and D2 are used for adjusting the above-described biases (for adjusting a balance between the positive output and the negative output).

Diodes D5 and D6 near an output part has a rectifying function for separating the positive portion and the negative portion of the output voltage. In order to prevent dead-zones from occurring in the output due to thresholds of the diodes D5 and D6, diodes D3 and D4 are inserted between the diodes D5 and D6. That is to say, the diode D3 biases the voltage applied on the diode D5 to cancel the dead-zone caused by the threshold value of the diode D5. Similarly, the diode D4 biases the voltage applied on the diode D6 to cancel the dead-zone caused by the threshold value of the diode D6.

Figure 8A:
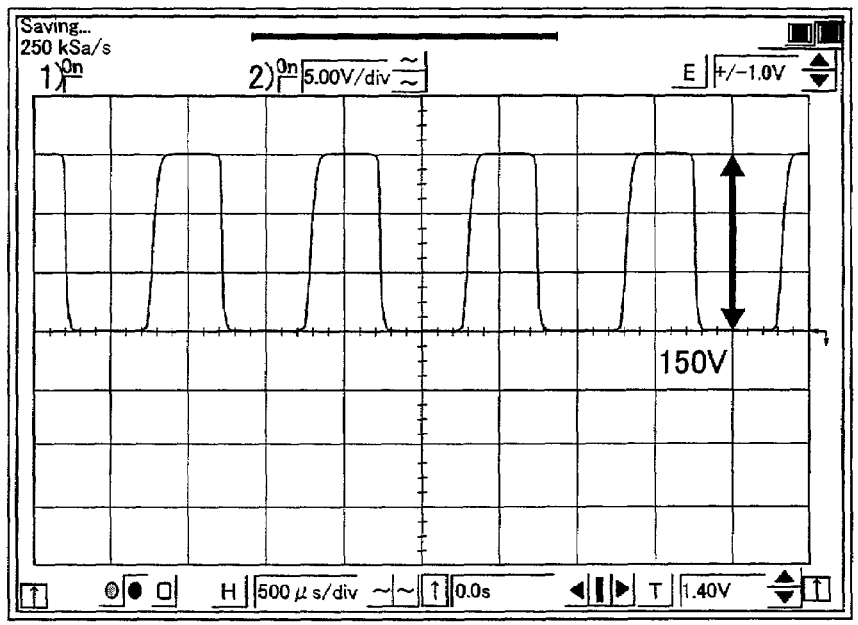
FIGS. 8A and 8B are diagrams showing output waveforms of the drive units shown in FIG. 7.
Figure 8B:
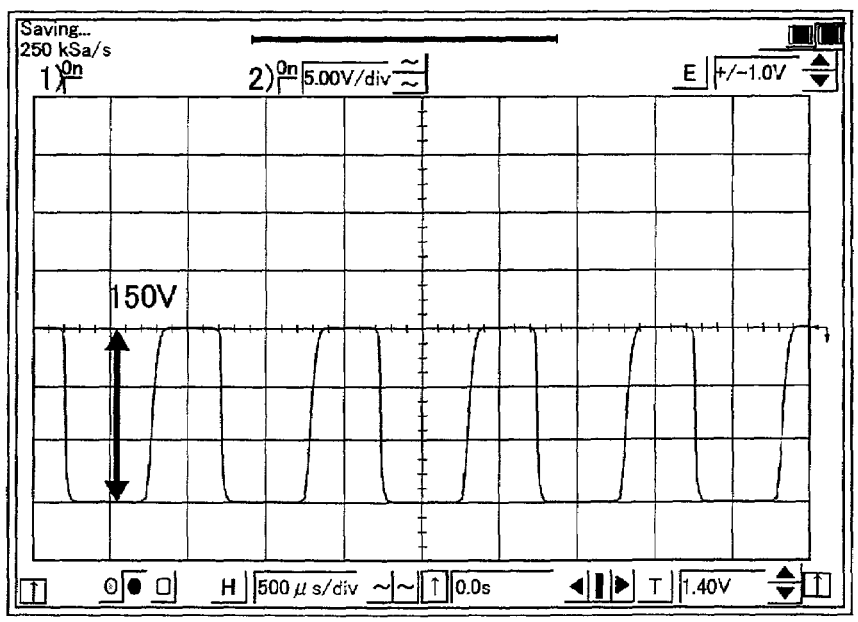

With such a circuit configuration, a positive output is obtained at an output terminal 01 (the electrode XR#1) of the drive circuit DRV 331 and a negative output is obtained at an output terminal 02 (the electrode XL#1) of the drive circuit DRV 331. FIGS. 8A and 8B are diagrams showing output waveforms of the drive units for a rectangular wave input of a voltage 1.7 V pp (centered on 0V). At peak values, a positive output of about +150V (see FIG. 8A) is obtained at the electrode XR#1 and a negative output of about −150V (see FIG. 8B) is obtained at the electrode XL#1.

FIGS. 9A through 9C are diagrams for explaining a relationship between an input and an output of the drive circuit DRV 331. When an input waveform shown in FIG. 9A is supplied, output waveforms shown in FIGS. 9B and 9C are obtained. As has been described above, the output waveforms have two values. As shown in FIG. 9B, the positive output has two values of 0V and 150V and as shown in FIG. 9C, the negative output has two values of 0V and −150V. It is to be noted that the waveforms are illustrated as an exemplary waveforms, and the output may be continuously and linearly controlled between the two values (analog control).

In other words, when an input to the drive circuit takes a positive value in a range of 0V to 0.85 V, a positive output of 0V to 150V, that is proportional to the drive input, appears on the terminal 01. Meanwhile, a voltage 0V is output at the terminal 02. In such a state, a right end of the micro-mirror MM is attracted by an electrostatic attractive force but there is no attractive force exerted on the left end of the micro-mirror MM. As a result, the micro-mirror MM is tilted through a predetermined angle in one direction depending on an absolute value of the electrostatic attractive force. When an input of the drive circuit takes a negative value in a range of 0V to −0.85 V, a negative output of 0V to −150V, that is proportional to the drive input, appears on the terminal 02. Meanwhile, a voltage 0V is output at the terminal 01. In such a state, a left end of the micro-mirror MM is attracted by a similar electrostatic attractive force (as has been described above, there is no positive and negative property for the electrostatic force and therefore an attractive force is exerted depending on an absolute value of the voltage of either a positive value or a negative value) but there is no attractive force exerted on the right end. As a result, the micro-mirror MM is tilted through a predetermined angle in a direction opposite the above-described direction depending on an absolute value of the electrostatic attractive force.

Figure 19:
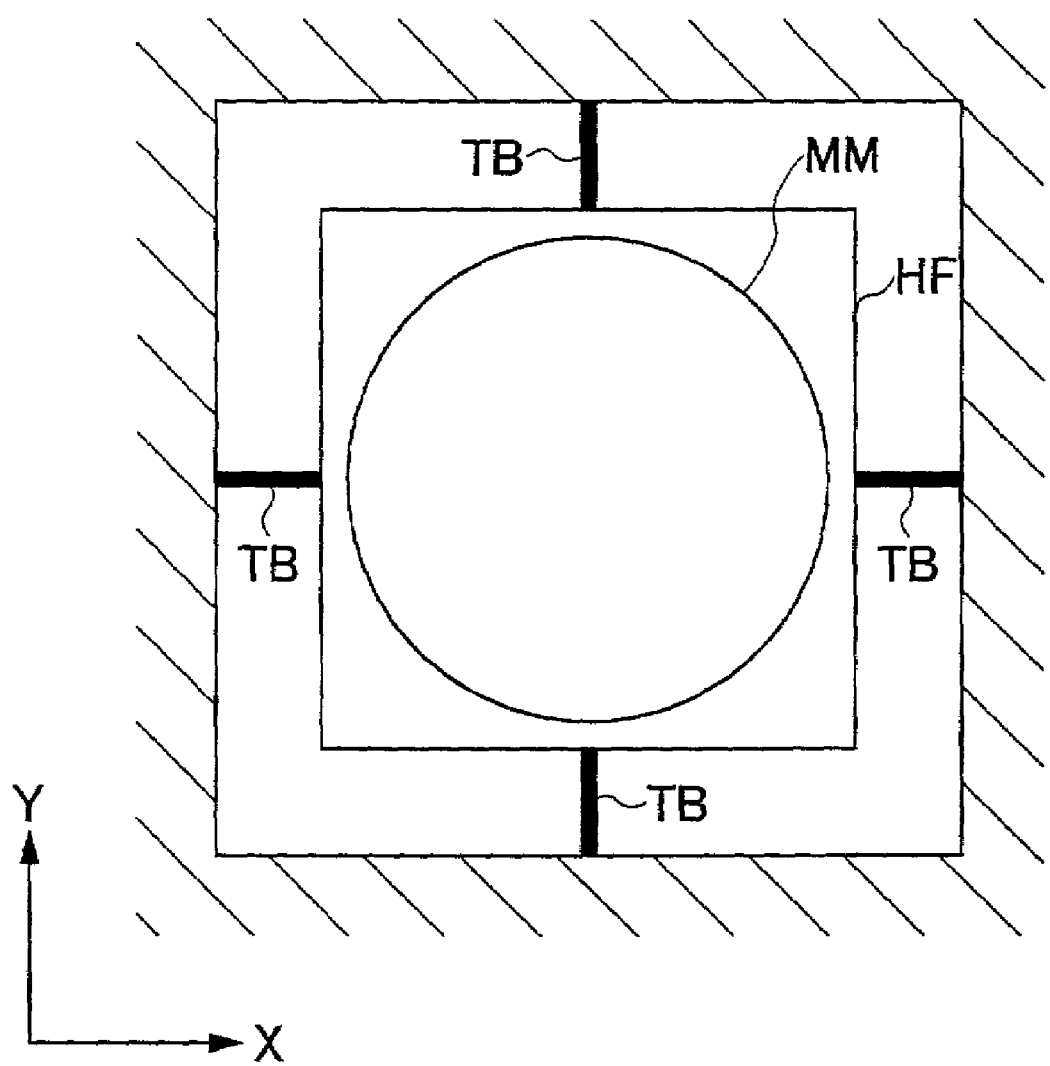
FIG. 19 is a plan view for explaining an example of a micro-mirror holding circuit included in an optical switch.

A micro-mirror holding circuit of an optical switch will be described with reference to FIG. 19. As shown in FIG. 19, each micro-mirror MM is held by, for example, a holding frame HF. Four points of the holding frame HF are fixed to the base via elastic torsion bars TB. Therefore, when an electrostatic force is externally exerted, the micro-mirror MM may be rotated in a forward direction or a reverse direction against elasticity of the torsion bars TB about an X-axis and a Y-axis. The tilt angle is determined based on an electrostatic attractive force exerted thereon.

Therefore, while an input of the drive circuit takes a positive value, the micro-mirror MM is driven by a positive output having a value proportional to the absolute value of the drive input. The micro-mirror MM is tilted through an angle corresponding to the absolute value thereof and about an x-axis in a first direction. While an input of the drive unit takes a negative value, the micro-mirror MM is driven by a negative output having a value proportional to the absolute value of the drive input. The micro-mirror MM is tilted through an angle corresponding to the absolute value thereof and about an x-axis in a second direction opposite to the first direction.

Similarly, the micro-mirror MM is rotated by a further drive circuit DRV 332 in a first direction about a Y-axis that is perpendicular to the X-axis and a second direction opposite to the first direction. As a result, the micro-mirror MM can be controlled three-dimensionally such that it is rotatable through any size of angle within a predetermined range of an angle.

As has been described, the number of drive circuits can be greatly reduced according to the present invention. Accordingly, the size of the optical switch as a whole is reduced and the optical switch can be operated with a reduced consumption power.

Figure 10:
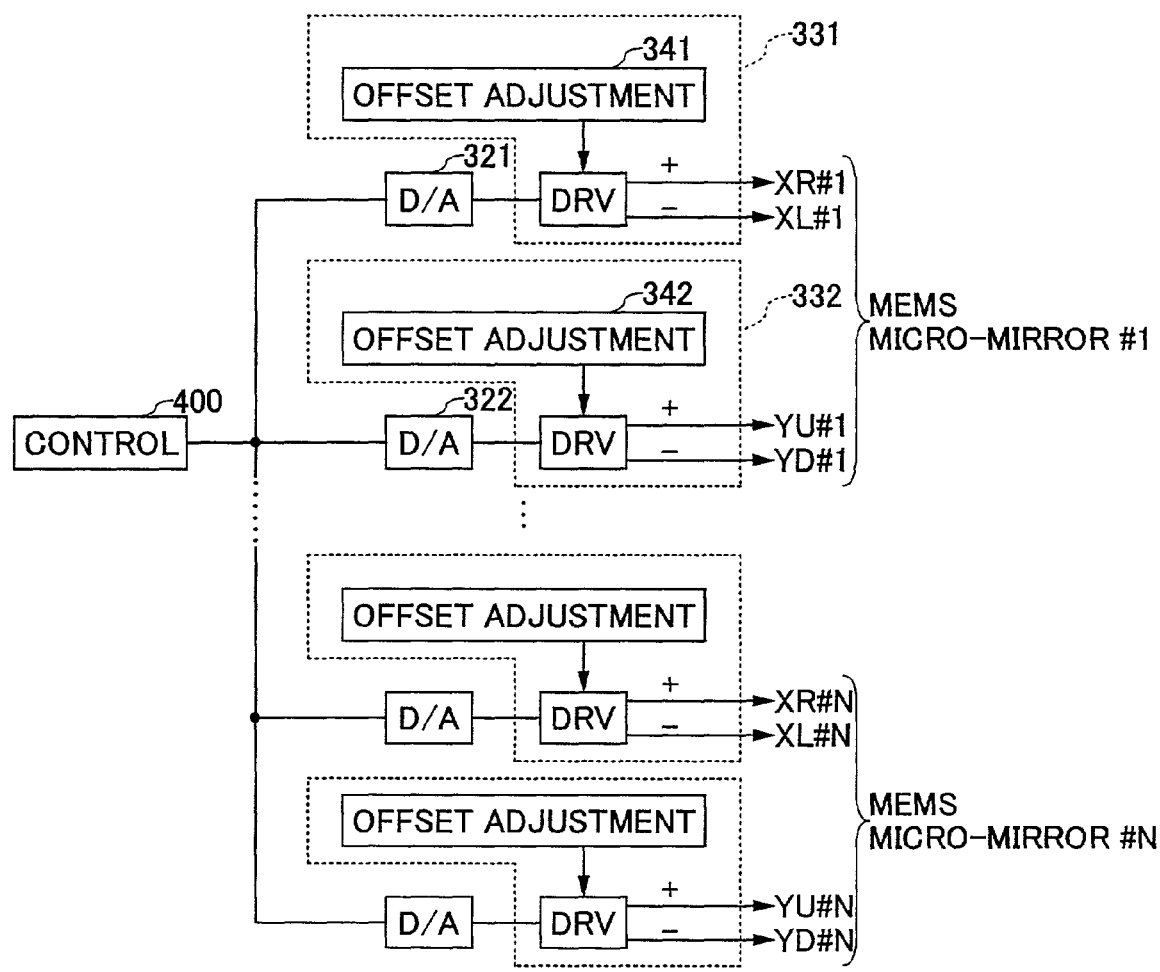
FIG. 10 is a diagram showing an example of a drive unit of an optical switch of a second embodiment of the present invention.

The above-described structure is to be understood as the first embodiment of the present invention. Referring now to FIG. 10, a second embodiment of the present invention will be described.

Figure 1A:
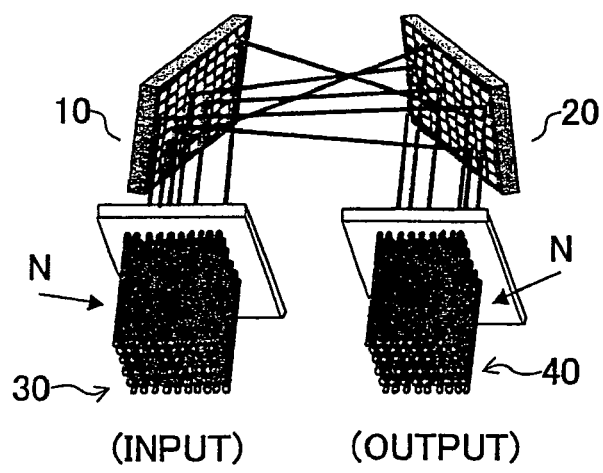
FIGS. 1A and 1B are schematic diagrams showing an optical switch of a three-dimensional configuration.
Figure 1B:
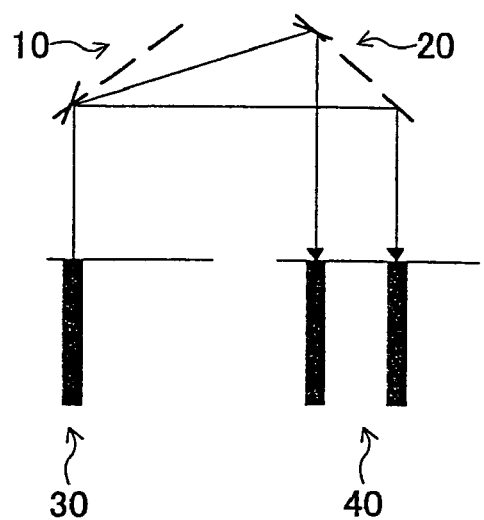
Figure 2A:
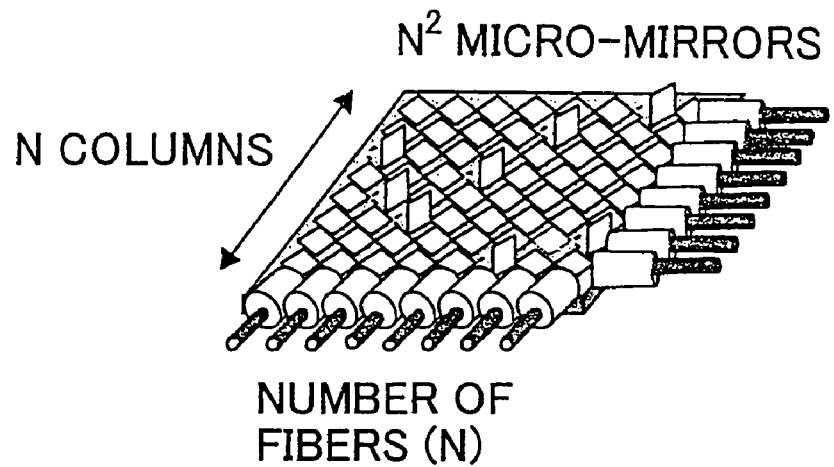
FIGS. 2A through 2C are diagrams showing, respectively, an optical switch of a two-dimensional configuration of the related art, an optical switch of a three-dimensional configuration of the related art and a graph for explaining the difference between the optical switches shown in FIGS. 2A and 2B.
Figure 2B:
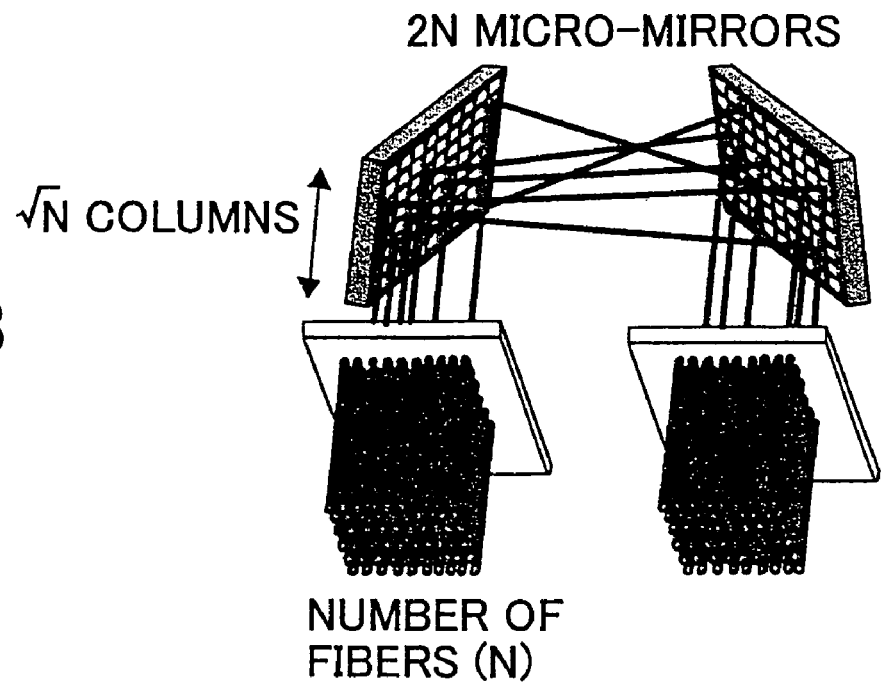
Figure 2C:
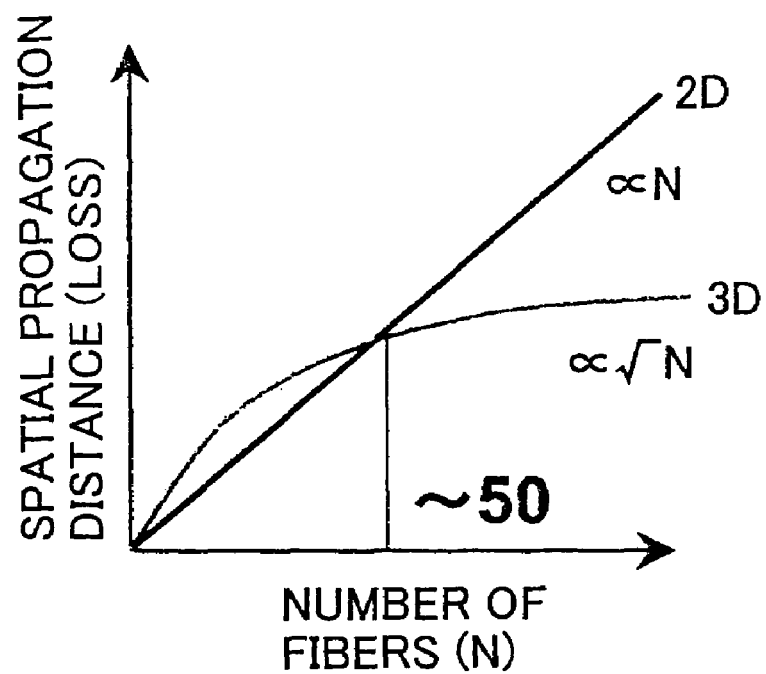

In the second embodiment of the present invention, the drive unit is further provided with offset adjustment circuits 341, 342 connected to the drive circuits 331 and 332. It is to be noted that the circuit structure shown in FIG. 7 already incorporated the offset adjustment circuit. Considering a symmetric property of the mirror disposition shown in FIGS. 1A and 1B, it is preferable that maximum tilt angles for on the left side and the right side (or on the upper side and the lower side) of an axis are the same for each micro-mirror MM. To this end, it suffices with a situation where a positive voltage peak value and a negative voltage peak value are equal after separating the positive voltage and the negative voltage. This can be achieved by a circuit for adjusting output offsets.

Figure 11A:
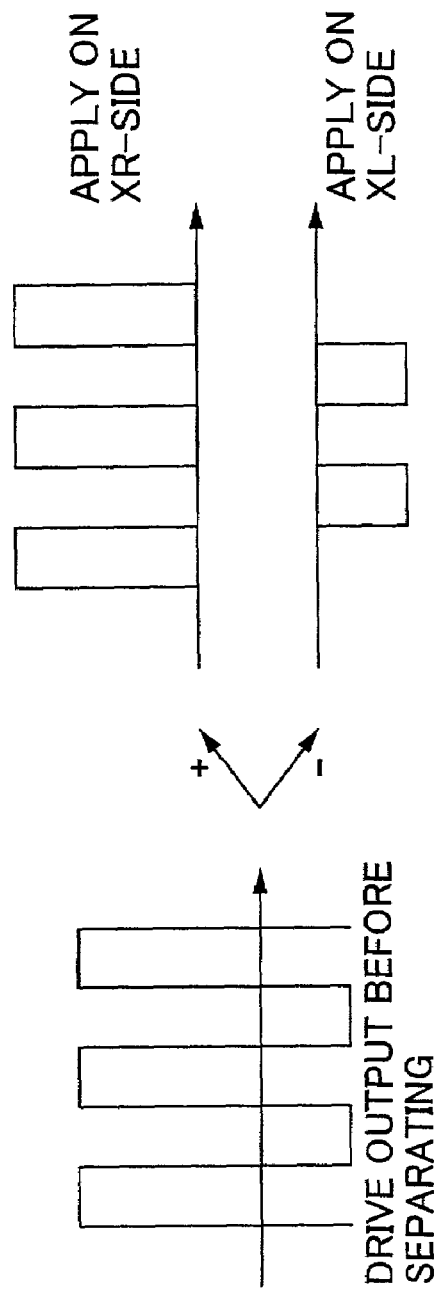
FIGS. 11A and 11B are diagrams showing output waveforms for explaining the configuration of the drive unit of an optical switch of the second embodiment of the present invention.
Figure 11B:
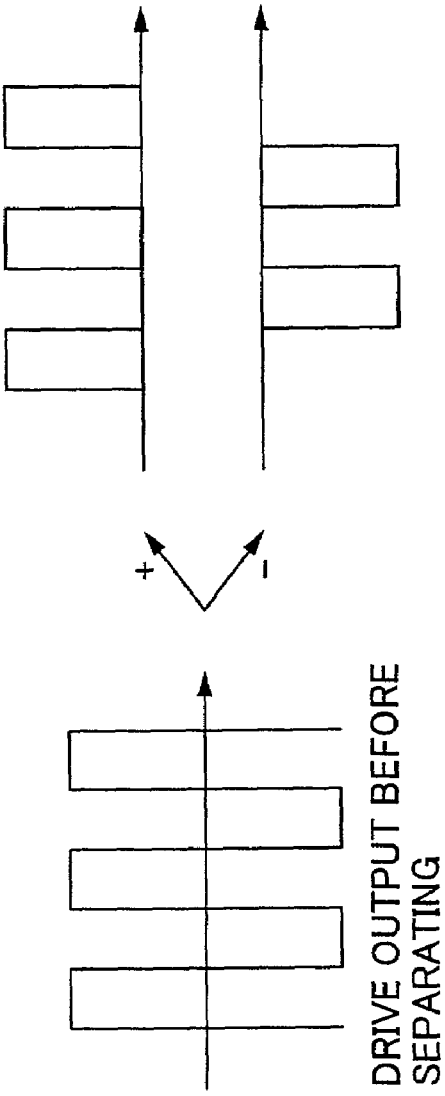

That is to say, as shown in FIG. 11A, when the output voltages before separation into positive and negative voltages (i.e., the voltage at connection point P between the diodes D3 and D4) is not symmetrical for the positive side and the negative side, absolute values for signals after separation will be different for the positive side and,the negative side. As a result, there arises a difference between an angle of a positive rotation and an angle of a negative rotation. In order to eliminate such a difference, as shown in FIG. 11B, the offset adjusting circuit balances the positive side voltage and the negative side voltage before separation. Thus, the difference between the absolute values of the positive output and the negative putout after separation will be eliminated. As a result, the positive tilt angle and the negative tilt angle about an axis can be equaled.

FIG. 10 is a diagram showing a principle of a drive unit of an optical switch of a second embodiment of the present invention. In order to adjust the output offset, the drive circuit may make use of the operational amplifier IC 102 having the offset adjustment terminals (1, 2) to adjusting the variable resistor RV2 connected to the offset terminal. Additionally, a subtracter (taking a difference between two inputs) may be provided at position upstream of the output terminals 01 and 02. The substracter may be provided with input terminals whereto an "output voltage" and a "direct voltage corresponding to the offset voltage" are input so as to cancel the offset voltage.

A drive unit of a third embodiment of the present invention will be described with reference to FIGS. 12 and 13.

In the present embodiment, the drive unit is further provided with gain-adjusting circuits 351 and 352 connected to the drive circuits 331 and 332. It is to be noted that the circuit structure shown in FIG. 7 already incorporated the offset adjustment circuit. The gain adjustment circuits 351 and 352 may be added to an embodiment of the drive unit shown in FIG. 10.

Figure 13:
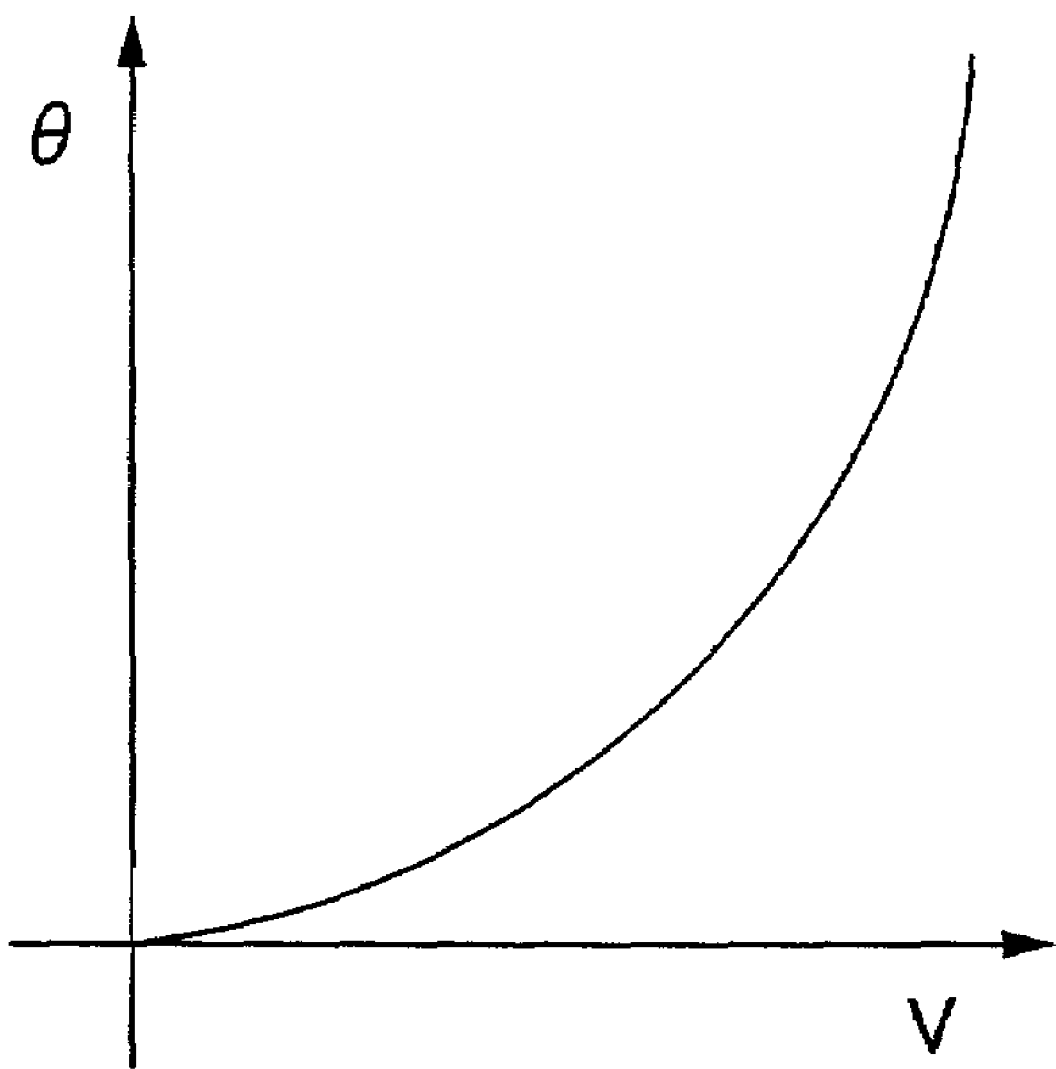
FIG. 13 is a graph for explaining the configuration of the drive unit of an optical switch of the third embodiment of the present invention.

As shown in FIG. 13, the voltage (V) for achieving a required tilt angle (θ) of the micro-mirror MM (V-θ characteristics) can be uniquely derived. The control circuit 400 has a memory table whereon the V-θ characteristics of the micro-mirror MM is prestored. The circuit 400 reads out voltage information corresponding to the required tilt angle of the micro-mirror MM from the memory table and outputs the voltage information in the form of digital signals. The D/A converters 312 and 322 convert the digital signals into analog signal. In general, the supply voltage of the D/A converter is less than 5V and in such a case, analog signals also have a voltage of about the same level. The voltage actually applied to the micro-mirror MM has a value obtained by linearly amplifying the analog signals by a gain of the drive circuit DRV. Therefore, the gain should be adjusted to be precisely equal to the voltage value specified in the above-mentioned memory table.

Figure 12:
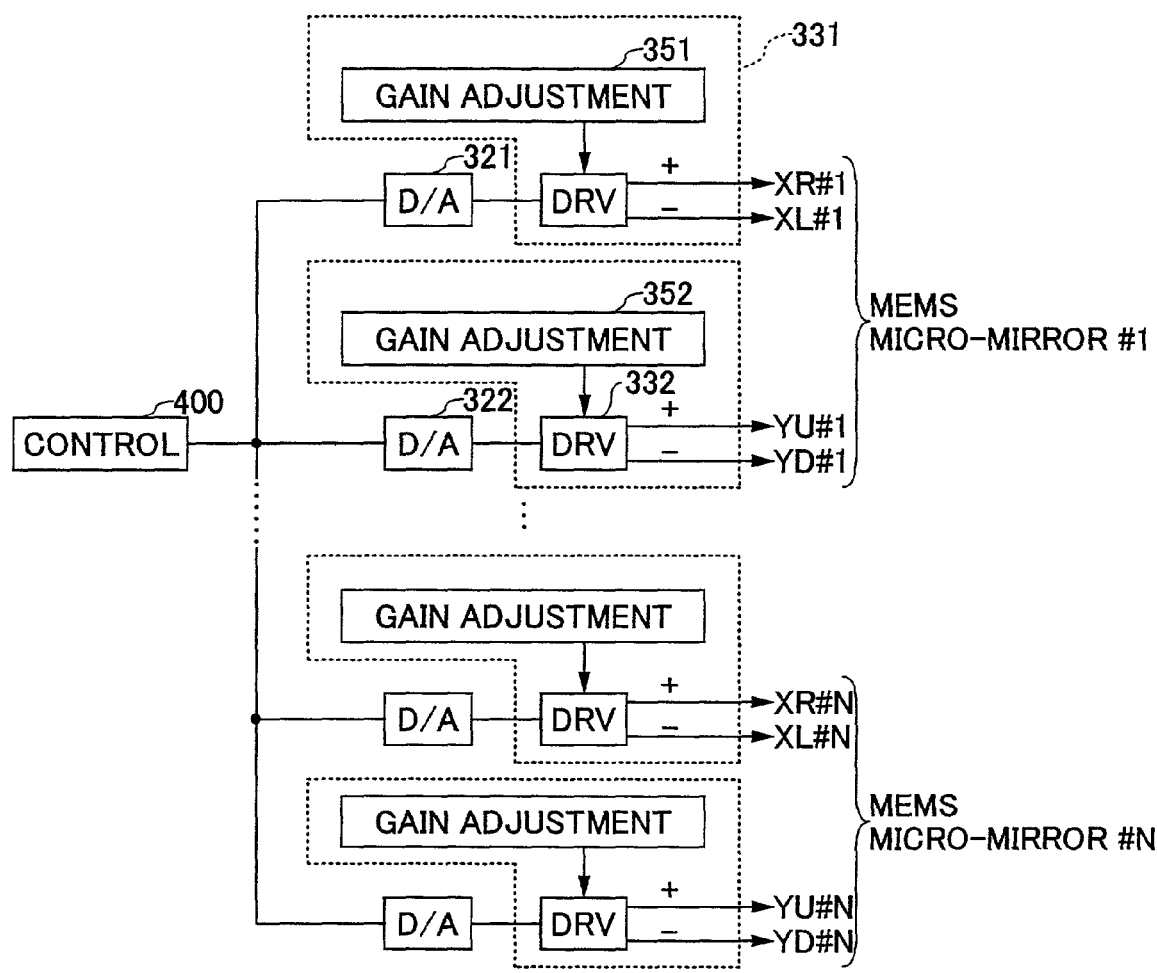
FIG. 12 is a diagram showing an example of a drive unit of an optical switch of a third embodiment of the present invention.

FIG. 12 is a diagram showing a principle of the drive unit of the third embodiment. In order to achieve a drive circuit having a desired gain, the circuits 351, 352 for adjusting the gain of the amplifying part is provided. As can be seen from circuit configuration of FIG. 7, in an operational amplifier used in the drive circuit DRV, a resistor for determining the gain is configured as a variable resistor RV1. Then, the gain can be adjusted by adjusting the variable resistor RV1.

Figure 14:
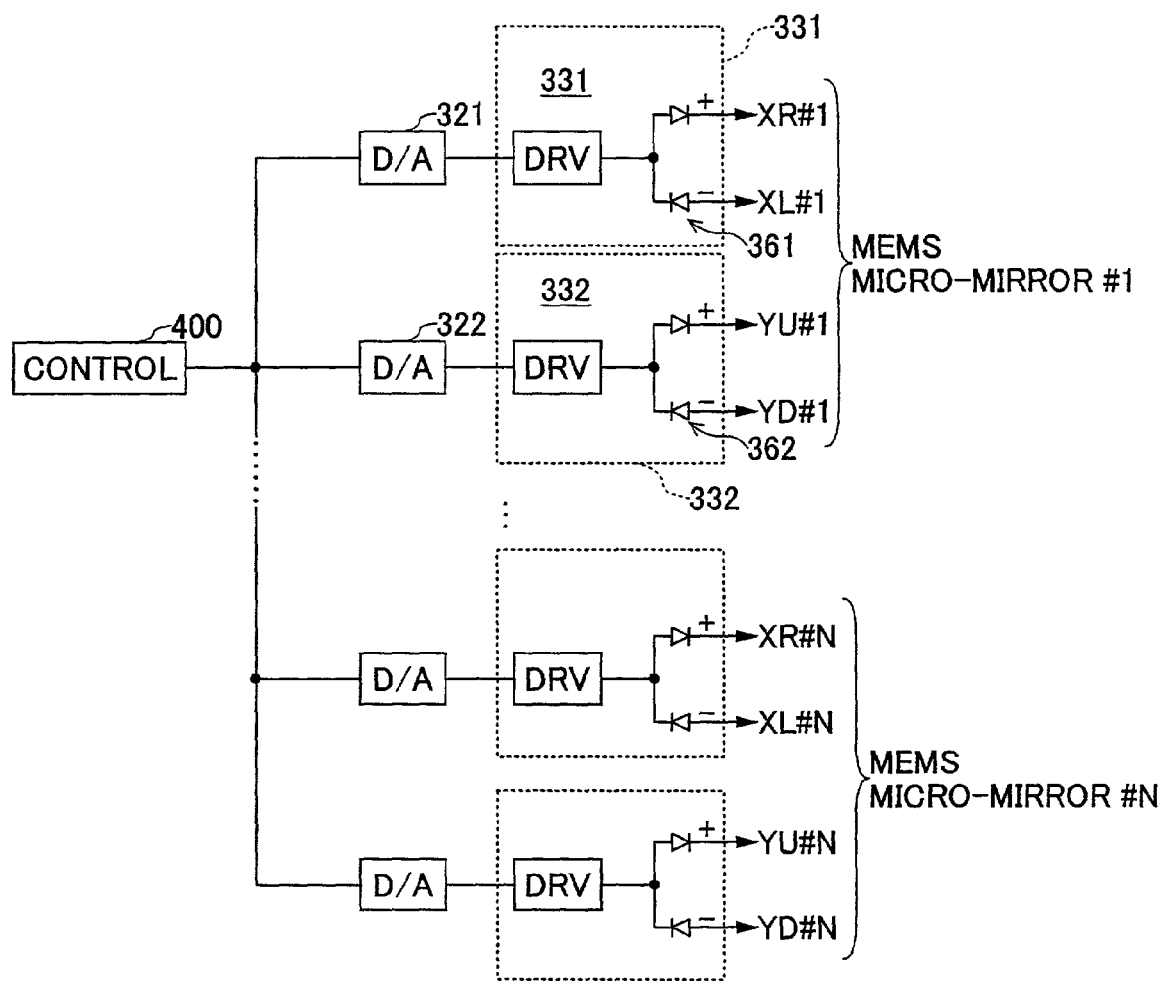
FIG. 14 is a diagram showing an example of a drive unit of an optical switch of a fourth embodiment of the present invention.

A drive unit of a fourth embodiment of the present invention will be described with reference to FIG. 14.

In the present embodiment, half-wave rectification circuits provided on the drive circuit DRV of the first embodiment has a specific configuration. FIG. 14 shows a principle diagram of the present invention provided with half-wave rectification circuits 361 and 362. The output of the amplifying circuit (voltage at the connection point P between the diodes D3 and D4) is branched. The diodes are connected to branched outputs, respectively, with the polarity being opposite. A diode connected in the forward direction (in an example of FIG. 7, the diode D5) is ON for the positive voltage output (the above-mentioned point P). A further diode (in an example of FIG. 7, the diode D6) connected in a reverse direction (connected to the output of the amplifying circuit) is ON for the negative output. According to such a rectifying characteristic of the diodes, the positive voltages and the negative voltages can be separated.

Figure 15:
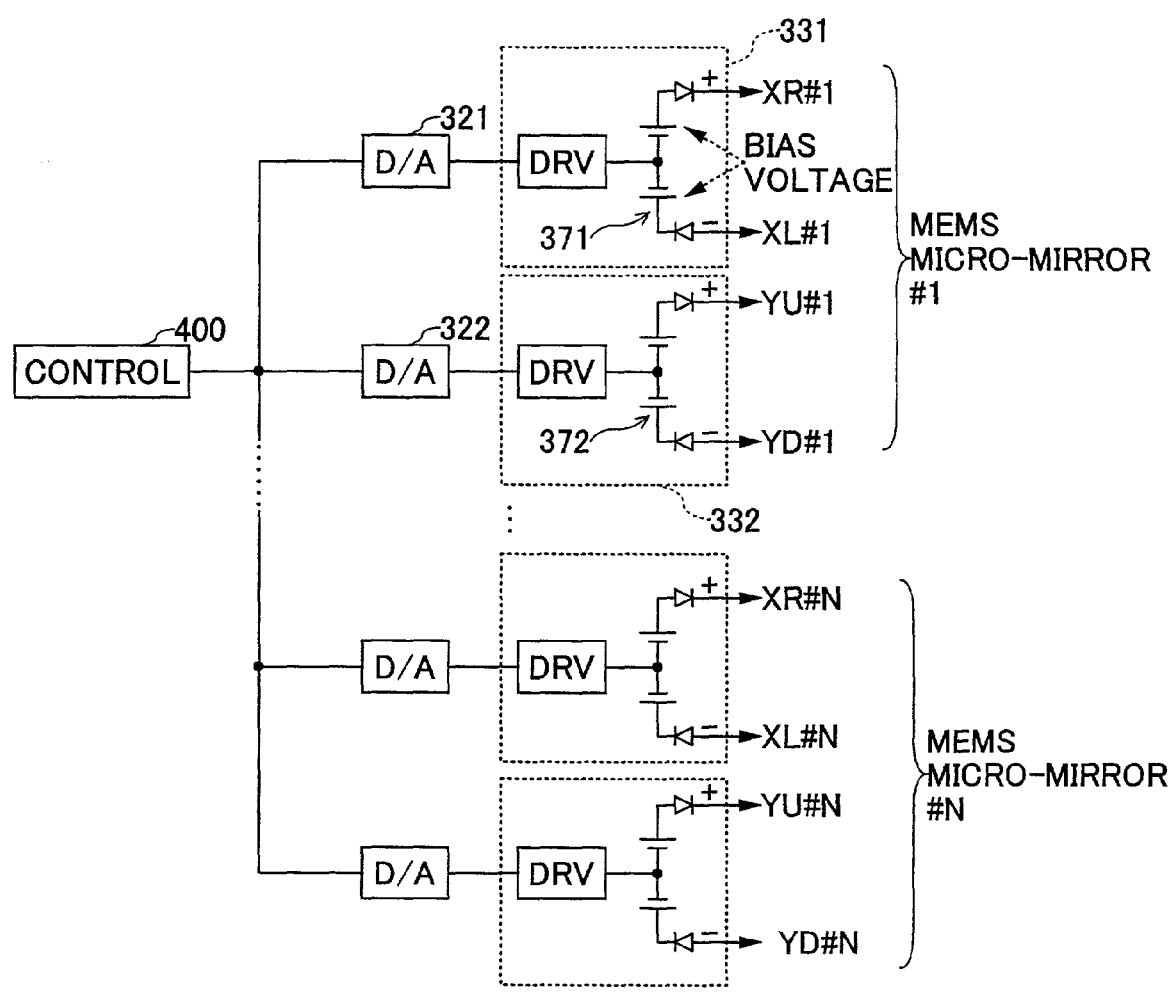
FIG. 15 is a diagram showing an example of a drive unit of an optical switch of a fifth embodiment of the present invention.

A drive unit of a fifth embodiment of the present invention will be described with reference to FIG. 15.

In the present embodiment, a feature for improving the characteristics near 0-level of the output of the drive circuits 331 and 332 of the fourth embodiment is specified. It is to be noted that this is already incorporated in the circuit structure shown in FIG. 7. Generally, diodes have a threshold value of about 0.7 V and thus blocks signals below 0.7 V. Therefore, according to the configuration of the fourth embodiment (a configuration similar to the configuration of FIG. 7 but without diodes D3 and D4 and being short-circuited), when the voltage at the point P is in the range of −0.7 to 0.7 V, a dead-zone occurs where the outputs at the terminals 01, 02 become zero volt (V). In order to eliminate the dead-zones, bias voltages sources 371 and 372 are provided for supplying bias voltages that are equal to the threshold values of the diodes D5, D6. FIG. 15 is a diagram showing the principle of the drive unit of the fifth embodiment. The above-mentioned bias voltage sources 371 and 372 can be achieved by the diodes D3 and D4 of a configuration of FIG. 7.

A drive unit of a sixth embodiment of the present invention will be described with reference to FIG. 15 that illustrates the fifth embodiment of the present invention.

In the present embodiment, a manner in which the bias voltages of the fifth embodiment are supplied is specified. In order to supply bias voltages for canceling the threshold values, diodes D3, D4 of the same types as the diodes D5, D6 used for rectification are provided. When the rectifying diodes and the biasing diodes are of the same type, a threshold for rectification and a threshold for biasing will be equal. Therefore, the dead-zone can be precisely canceled out.

Figure 16:
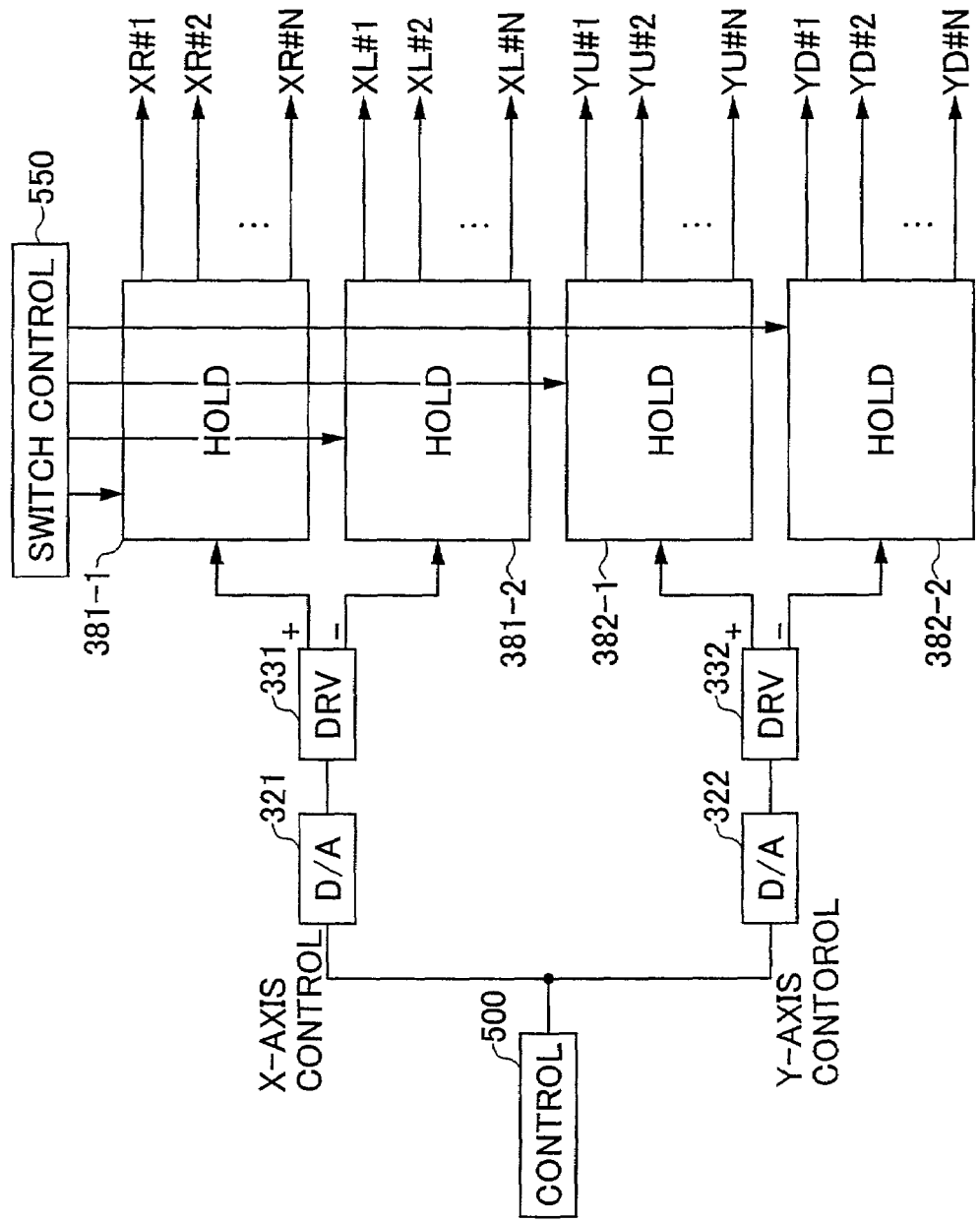
FIG. 16 is a diagram showing an example of a drive unit of an optical switch of a seventh embodiment of the present invention.

A drive unit of a seventh embodiment of the present invention will be described with reference to FIG. 16.

In the present embodiment, the output values of the drive circuit DRV of the first embodiment are held in holding parts 381-1, 381-2, 382-1 and 382-2 and are allotted between the electrodes under control of a switch controller 550. FIG. 16 is a diagram showing the principle of the drive unit of the seventh embodiment of the present invention. The detailed structure will be described with reference to the following embodiments.

Figure 17:
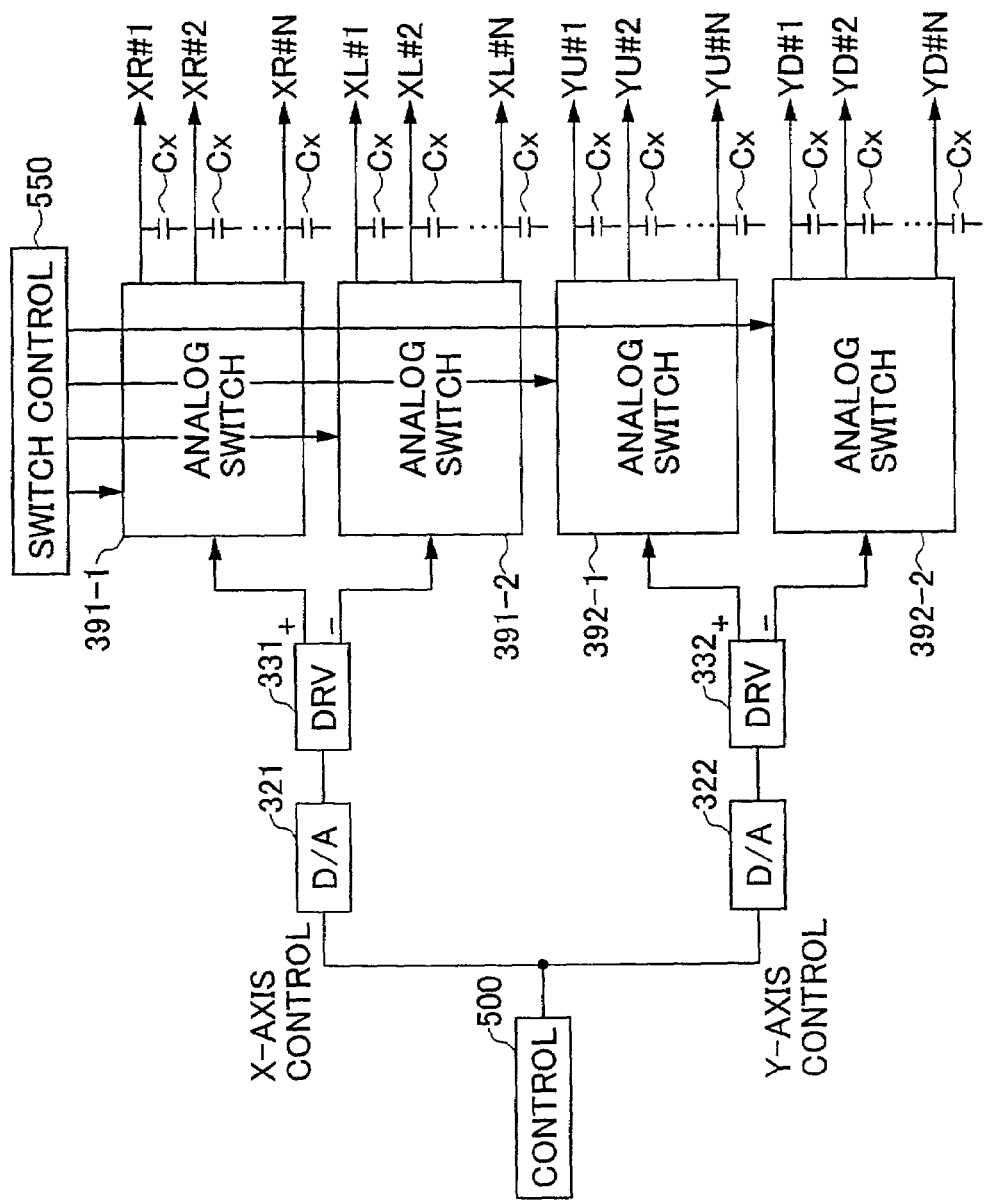
FIG. 17 is a diagram showing an example of a drive unit of an optical switch of a eighth embodiment of the present invention.

A drive unit of an eighth embodiment of the present invention will be described with reference to FIG. 17.

In the present embodiment, a circuit (holding part) for holding the output values of the drive circuit of the seventh embodiment is specified. In detail, the holding part includes analog switches 391-1 (X-axis, positive direction), 391-2 (X-axis, reverse direction), 392-1 (Y-axis, positive direction), 392-2 (Y-axis, reverse direction) and capacitances (capacitors) Cx connected to the electrodes XR#1, XR#2, XR#3, . . . XR#N. FIG. 17 is a diagram showing a principle of the drive unit. The analog switches 391-1, 391-2, 392-1 and 392-2 are in turn switched by the controller 550 to select the electrode whereto the voltages held in the holding parts are to be supplied.

Figure 18:
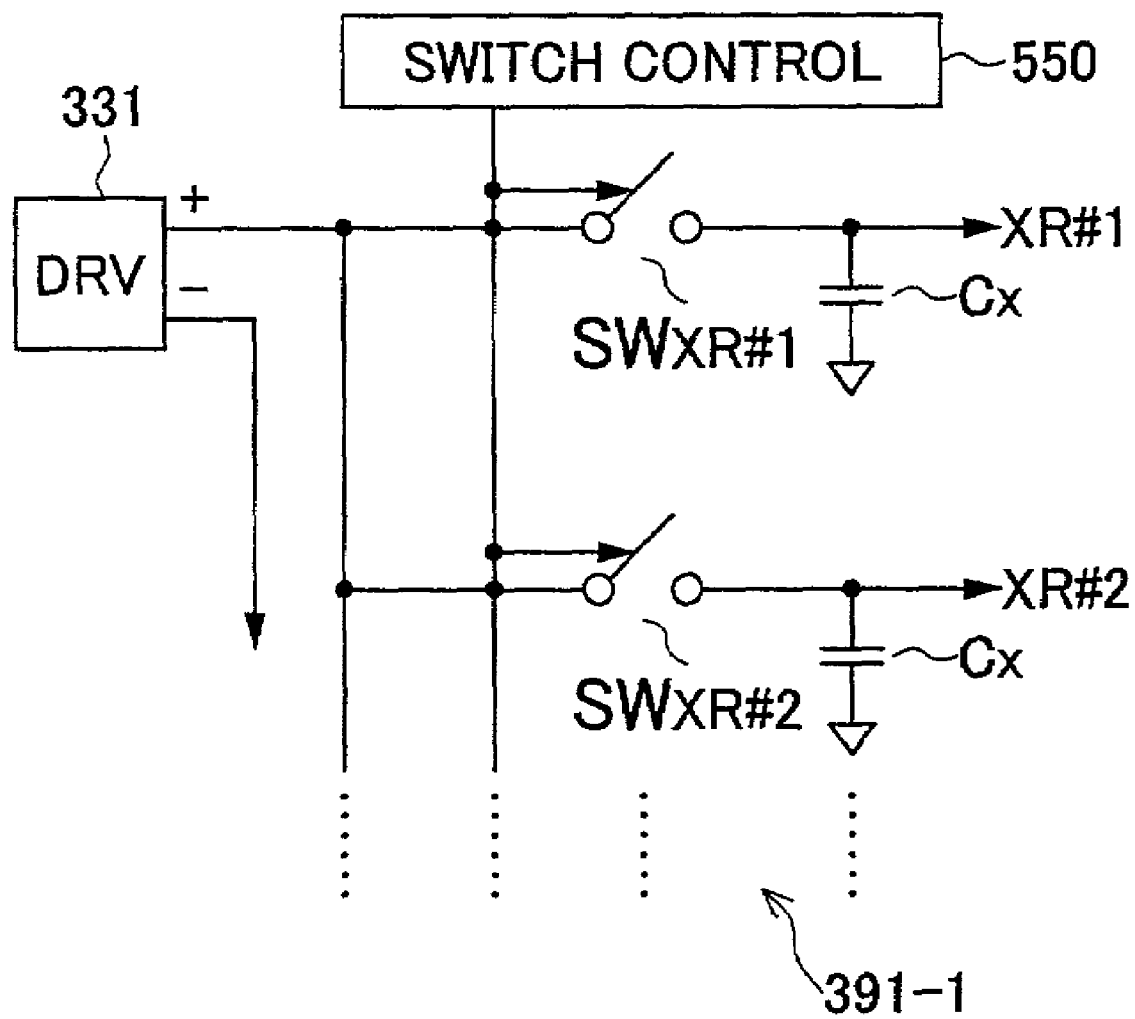
FIG. 18 is a partial circuit diagram for explaining the configuration of the drive unit of an optical switch of the eighth embodiment of the present invention.

In detail, as shown in FIG. 18, the outputs of the drive circuit DRV are connected to the capacitances Cx connected to the electrodes XR#1, XR#2, XR#3, . . . XR#N for a predetermined period of time in a time-sharing manner by means of switches $SW_{XR\#1}$, $SW_{XR\#2}$, $SW_{XR\#3}$, . . . $SW_{XR\#N}$. That is to say, for example, the positive inputs of the drive circuit 331 are in turn switched between the electrodes XR#1, XR#2, XR#3, . . . XR#N for predetermined periods. Accordingly, the output voltages of the drive circuit DRV for each timing can be supplied to and held in the corresponding capacitances Cx.

According to the present embodiment, a single drive circuit 331 or 332 is sufficient for controlling the tilt angle of the micro-mirror MM about the X-axis or the Y-axis, respectively. Therefore, the scale of the hardware configuration can be substantially reduced and the required power can be efficiently reduced.

It is to be noted that for the capacitance used in the holding part, electrostatic capacitance of each of the micro-mirrors MM that structurally inevitable occurs can be used instead of the capacitors provided for this purpose. The value of capacitance is determined by factors such as the shape of the micro-mirror (including the holding frame of the example shown in FIG. 19) and thus a desired capacitance value can be obtained by suitably manufacturing the micro-mirrors.

Figure 3:
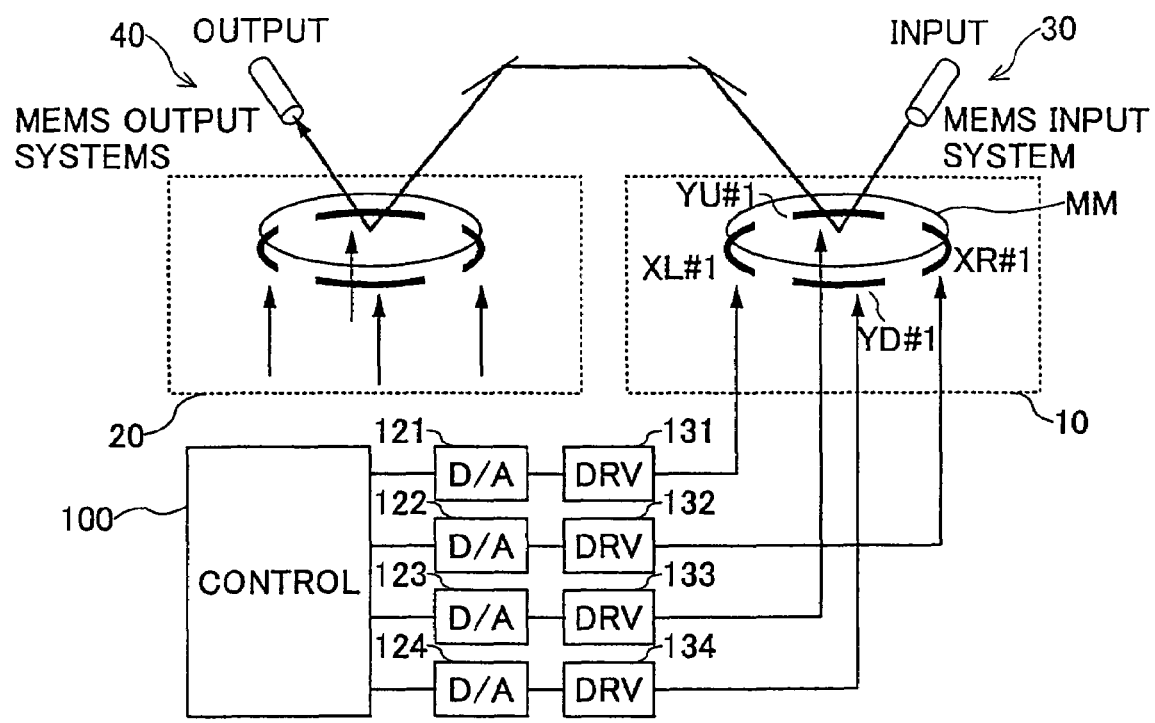
FIG. 3 is a schematic diagram showing an example of a drive unit of an optical switch.
Figure 4:
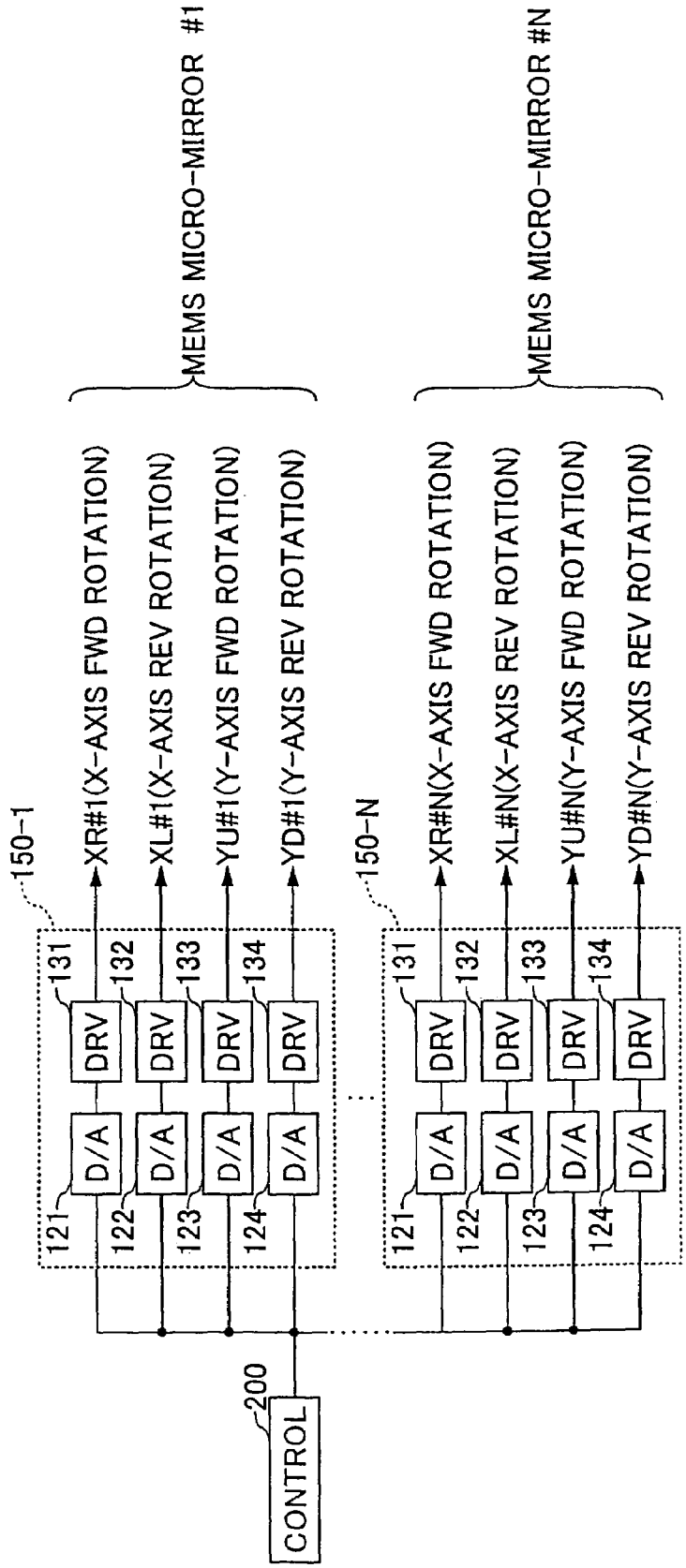
FIG. 4 is a diagram showing an example of a drive unit of an optical switch of the related art.

Accordingly, with the present invention, as shown in FIGS. 5 and 6, the number of drive circuit can be halved compared to the drive unit of the related art shown in FIGS. 3 and 4. Thus, the scale of the hardware configuration can be substantially reduced and the required power can be efficiently reduced. Such an advantageous effect becomes prominent as the number of channels to be optically coupled increases. Therefore, the present invention is expected to have a great effect when applied to an optical switch having a scale of about a several thousand channels that may be developed in the future.

It is to be noted that the detailed circuit structure of the drive circuit DRV of the present invention is not limited to the circuit shown in FIG. 7, but may also be other circuits as long as a balance between the absolute values of the positive output and the negative output can be achieved as shown in FIG. 9.

Further, the present invention is not limited to these embodiments, and variations and modifications may be made without departing from the scope of the present invention.

The present application is based on Japanese priority application No. 2001-333567 filed on Oct. 30, 2001, the entire contents of which are hereby incorporated by reference.

What is claimed is:

1. A drive unit for controlling optical paths of an optical switch having at least one optical switch element and at least one pair of electrodes arranged near said movable optical switch element, each pair including a first electrode and a second electrode provided at a position opposite to said first electrode, said drive unit comprising at least one drive circuit for said at least one movable optical switch element, respectively, said drive circuit having a separating part for separating voltages into positive and negative voltages and a output for supplying said positive voltages to to said first electrode and negative voltages to said second eletrode to generate electrostatic forces between said movable optical swicth element and each of said first and second electrodes to control at least one of said paths.

2. The drive unit as claimed in claim 1, wherein said drive circuit comprises an offset adjustment circuit for adjusting direct-current level of output signals.

3. The drive unit as claimed in claim 1, wherein said drive circuit comprises a gain adjustment circuit for adjusting gain of said drive circuit.

4. The drive unit as claimed in claim 1, said output of the drive circuit being branched into a first branch whereto an anode of a first diode is connected and a second branch whereto a cathode of a second diode is connected, said positive voltage being obtained from an output of said first diode and said negative voltage being obtained from an output of said second diode.

5. The drive unit as claimed in claim 4, wherein bias voltage applying elements are provided for said first and second diodes, respectively, and bias voltages applied by said bias voltage applying elements correspond to threshold voltage of said first and second diodes, respectively.

6. The drive unit as claimed in claim 5, wherein diodes having the same structure as the diodes connected to said first and second branches are provided as said bias voltage applying elements such that dead-zones of the output voltages that corresponds to the threshold voltages of the diodes connected to the output of said drive circuit are removed.

7. The drive unit as claimed in claim 1, said drive unit including two drive circuits, said drive unit further comprising at least one output-holding circuit for holding said positive voltages and negative voltages from said drive circuits and supplying said voltages to said electrodes of said at least one optical switch element.

8. The drive unit as claimed in claim 7, wherein said output-holding circuit includes a plurality of analog switches and a plurality of capacitances, each for a respective movable optical switch element, said analog switches being switched in turn such that outputs from said analog switches are held in said capacitances and then supplied to said electrodes of the optical switch element.

9. The drive unit as claimed in claim 8, wherein said capacitance is a capacitive component of said optical switch element.

10. The optical switch as claimed in claim 1, wherein said movable optical switch element is a two-axis micro-mirror.

11. An optical switch comprising:

at least one optical switch element;

at least one pair of electrodes arranged near said movable optical switch element, each pair including a first electrode and a second electrode provided at a position opposite to said first electrode; and a drive unit including at least one drive circuit for supplying voltages to said pair of electrodes to generate electrostatic forces between the pair of electrodes and the movable optical switch element to control an optical path of the movable optical switch element, said voltages being separated into positive voltages supplied to said first electrode and negative voltages supplied to said second electrode.

12. An optical switch comprising:

at least one optical switch element;

at least one pair of electrodes arranged near said movable optical switch element, each pair including a first electrode and a second electrode provided at a position opposite to said first electrode; and a drive unit including at least one drive circuit for supplying voltages to the pair of electrodes to generate electrostatic forces between the pair of electrodes and the movable optical switch element to control an optical path of the optical switch element, the voltages being separated into positive voltages supplied to said first electrode and negative voltages supplied to the second electrode, wherein the drive circuit controls movement of the movable optical switch element in a plurality of mutually opposite directions.

* * * * *

UNITED STATES PATENT AND TRADEMARK OFFICE
CERTIFICATE OF CORRECTION

PATENT NO. : 7,035,496 B2  Page 1 of 1
APPLICATION NO. : 10/097931
DATED : April 25, 2006
INVENTOR(S) : Shinji Yamashita et al.

It is certified that error appears in the above-identified patent and that said Letters Patent is hereby corrected as shown below:

Column 10, Line 53 after "one" insert --movable--.

Column 10, Line 60 after "positive" insert --voltages--.

Column 10, Line 61 after "and" change "a" to --an--.

Column 10, Line 62 delete "to" before "said".

Column 10, Line 62 after "and" insert--said--.

Column 10, Line 63 change "eletrode" to --electrode--.

Column 10, Line 64 change "swicth" to --switch--.

Column 11, Line 30 after "one" insert --movable--.

Column 11, Line 38 after "said" insert --movable--.

Column 12, Line 4 after "one" insert --movable--.

Column 12, Line 18 after "one" insert --movable--.

Column 12, Line 23 after "circuit" delete "for".

Column 12, Line 28 after "to" change "said" to --the--.

Signed and Sealed this

Sixteenth Day of January, 2007

JON W. DUDAS
*Director of the United States Patent and Trademark Office*